Feb. 5, 1929.
H. L. TANNER
ELECTRODYNAMIC TRANSMISSION SYSTEM
Original Filed Aug. 21, 1919  9 Sheets-Sheet 3
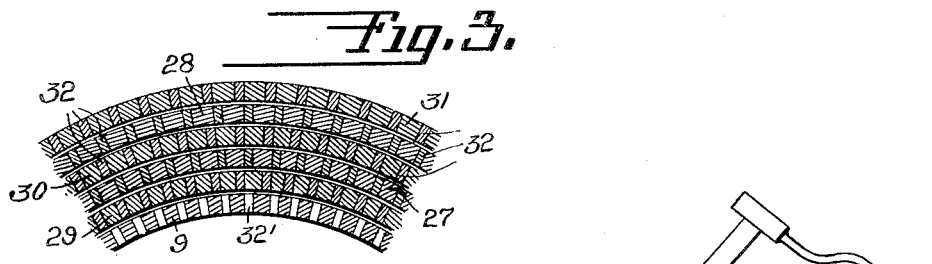
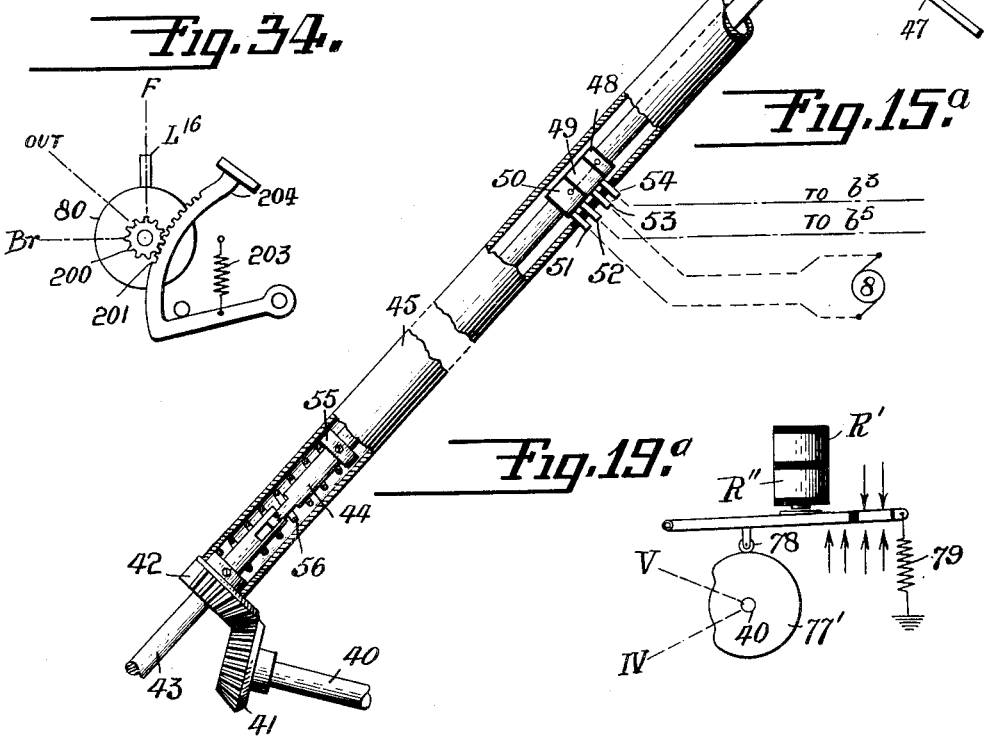
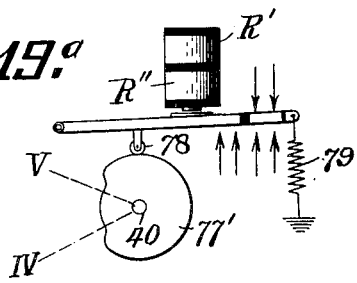
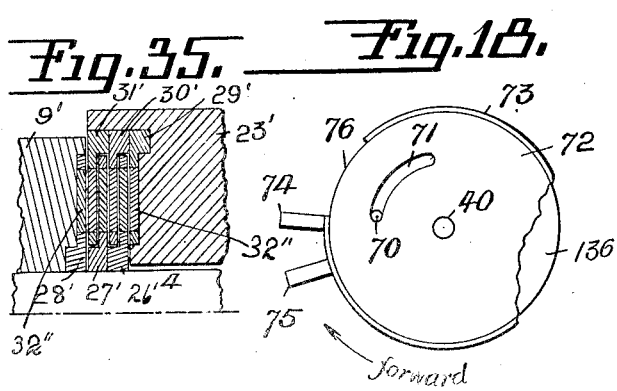
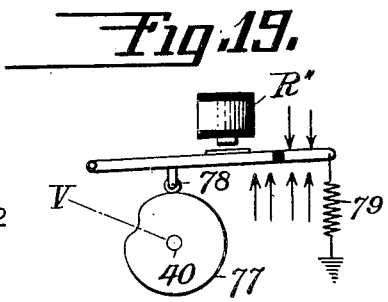
INVENTOR.
HARRY L. TANNER.
BY Herbert H. Thompson
his ATTORNEY Feb. 5, 1929.

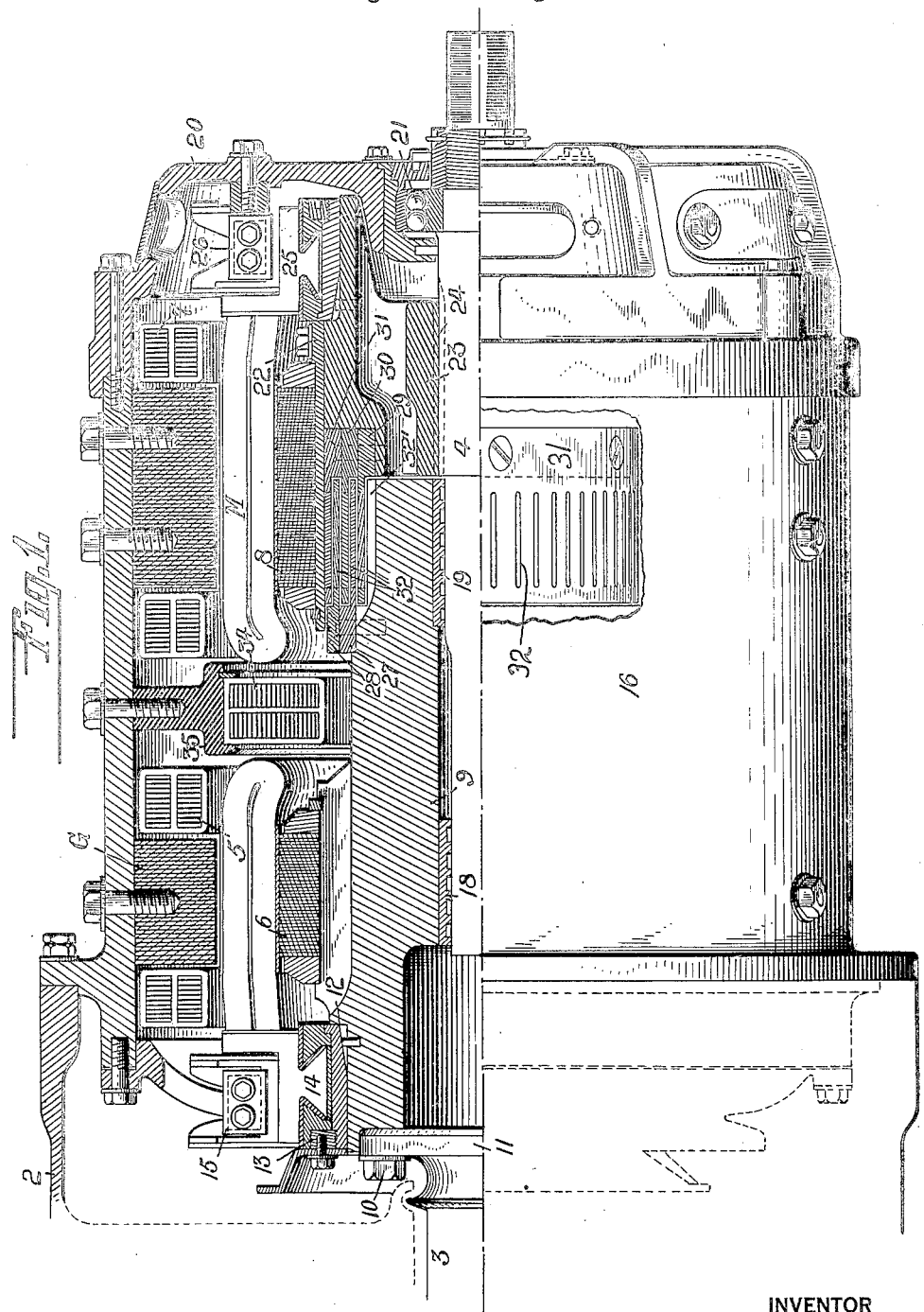

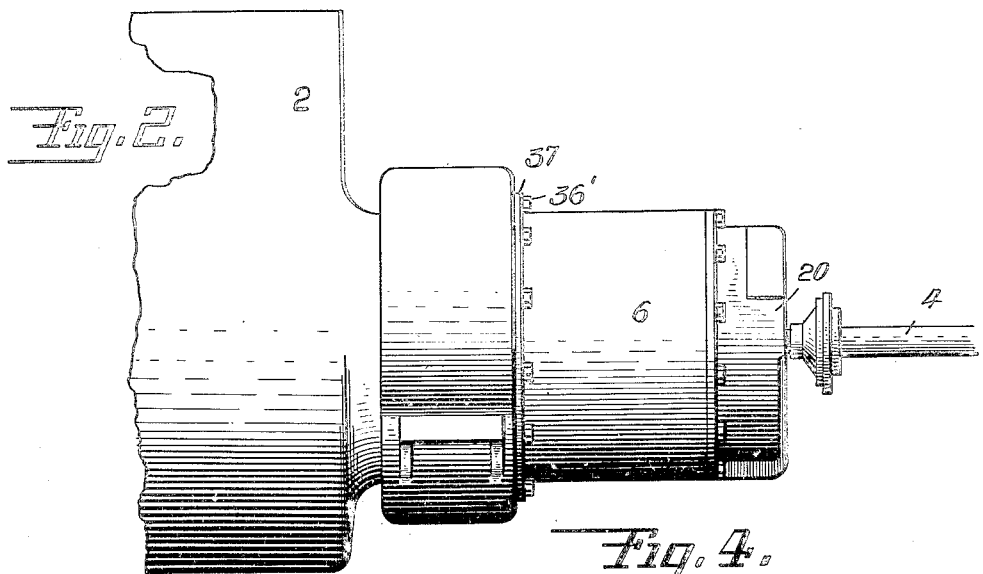
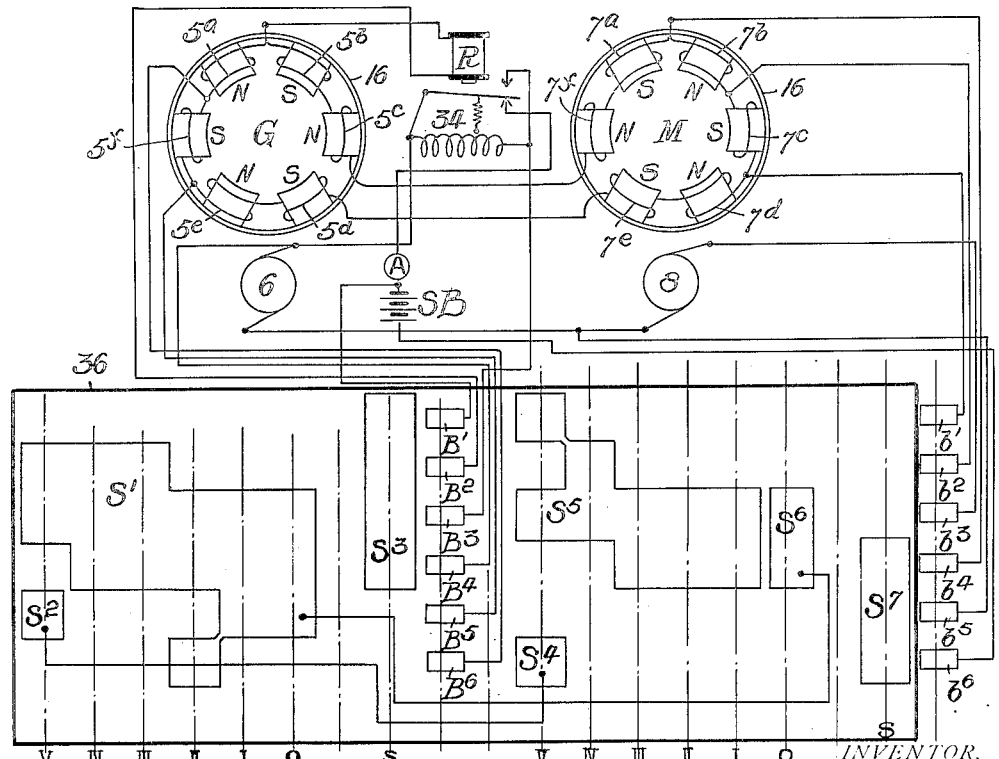

H. L. TANNER 1,700,780

ELECTRODYNAMIC TRANSMISSION SYSTEM

Original Filed Aug. 21, 1919    9 Sheets-Sheet 4

INVENTOR.
HARRY L. TANNER.
BY
Herbert H. Thompson
his ATTORNEY.

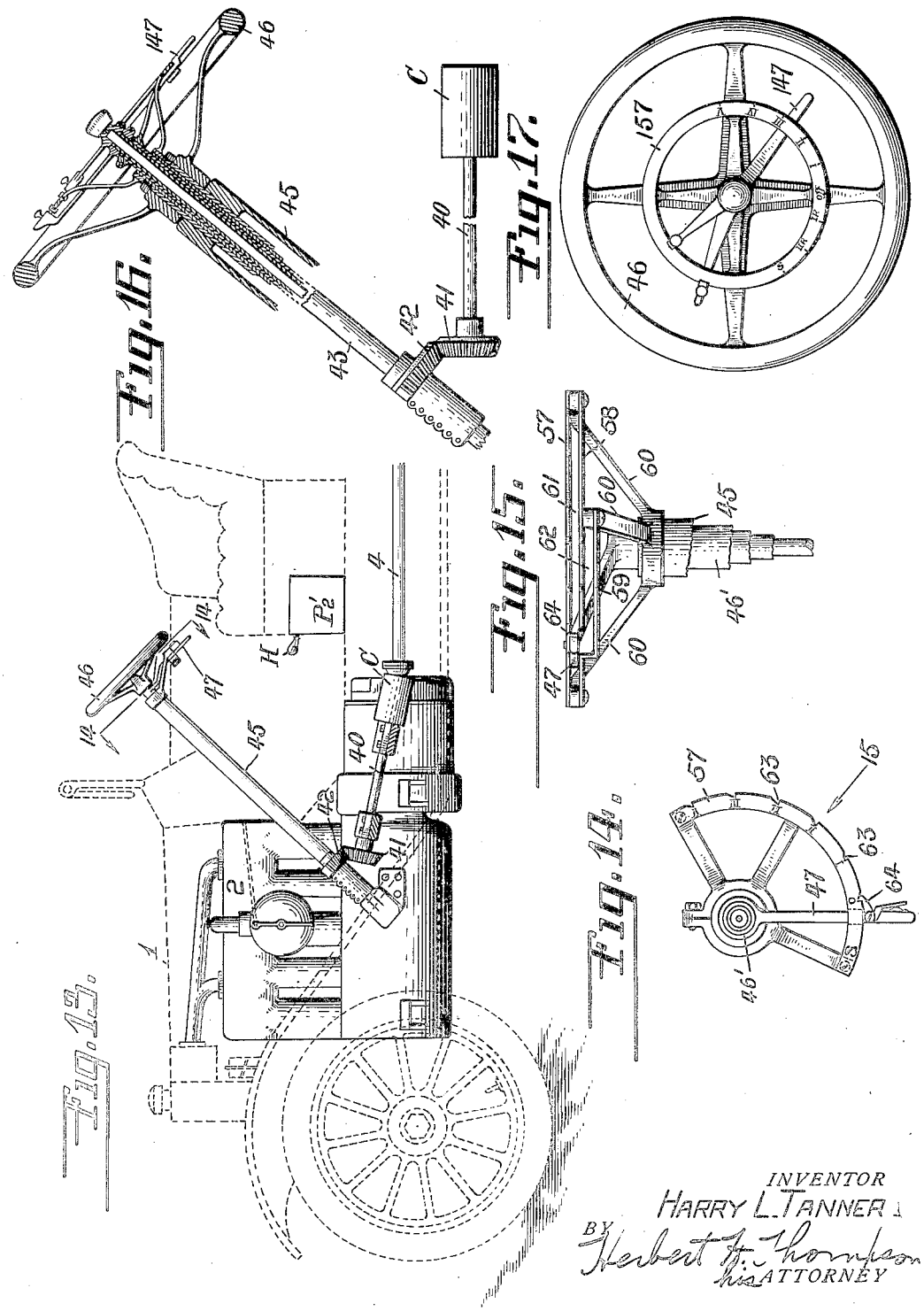

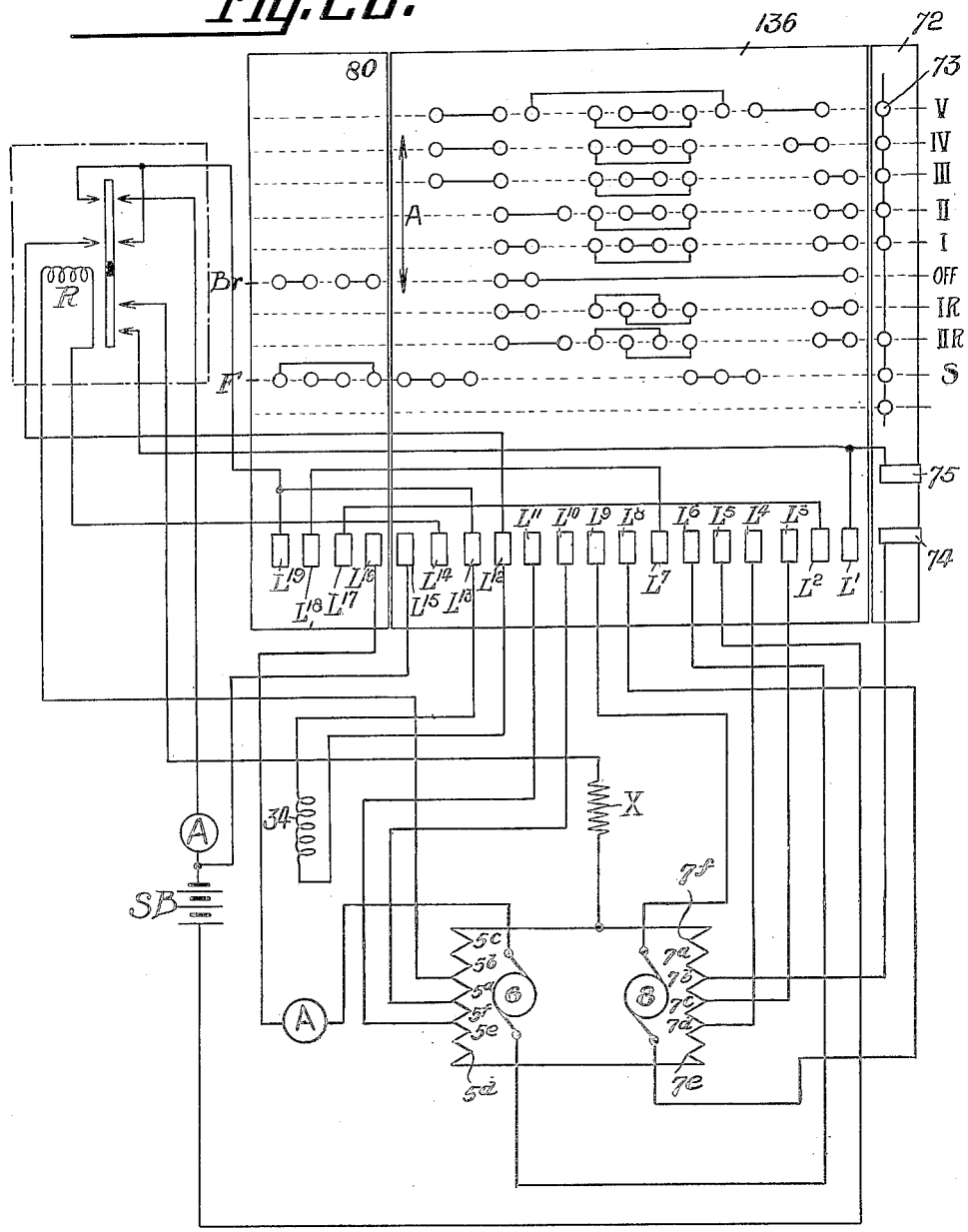

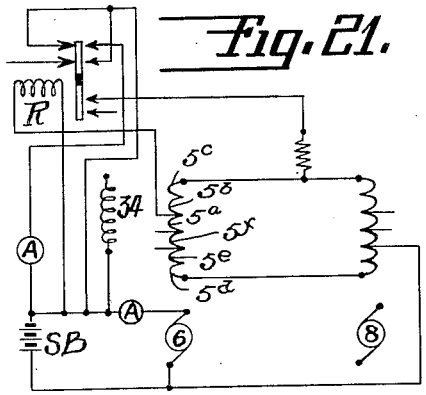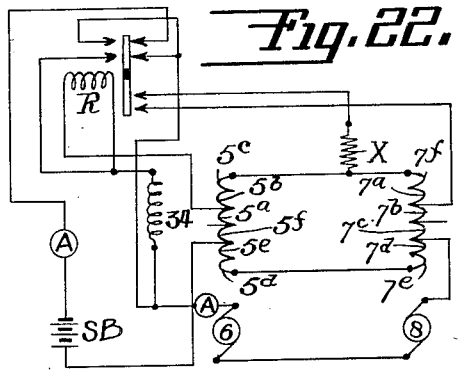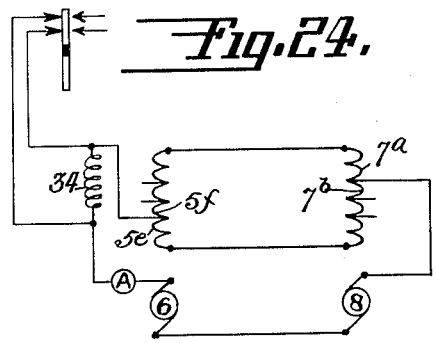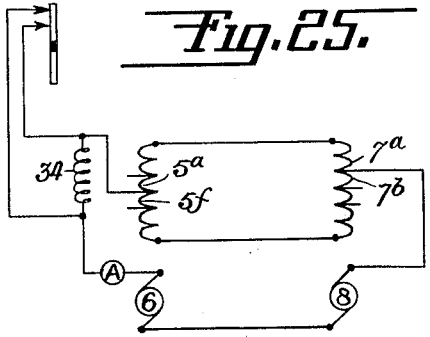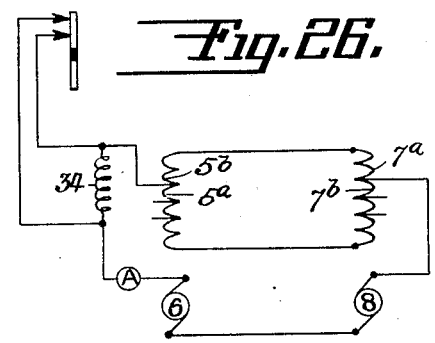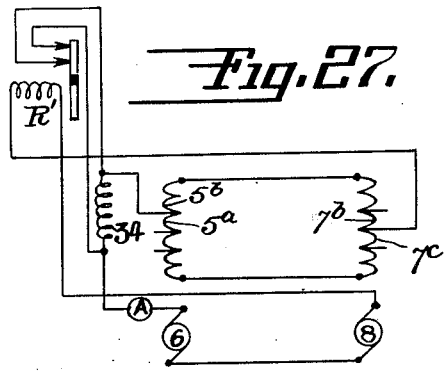
INVENTOR.
HARRY L. TANNER
BY Herbert H. Thompson
his ATTORNEY.

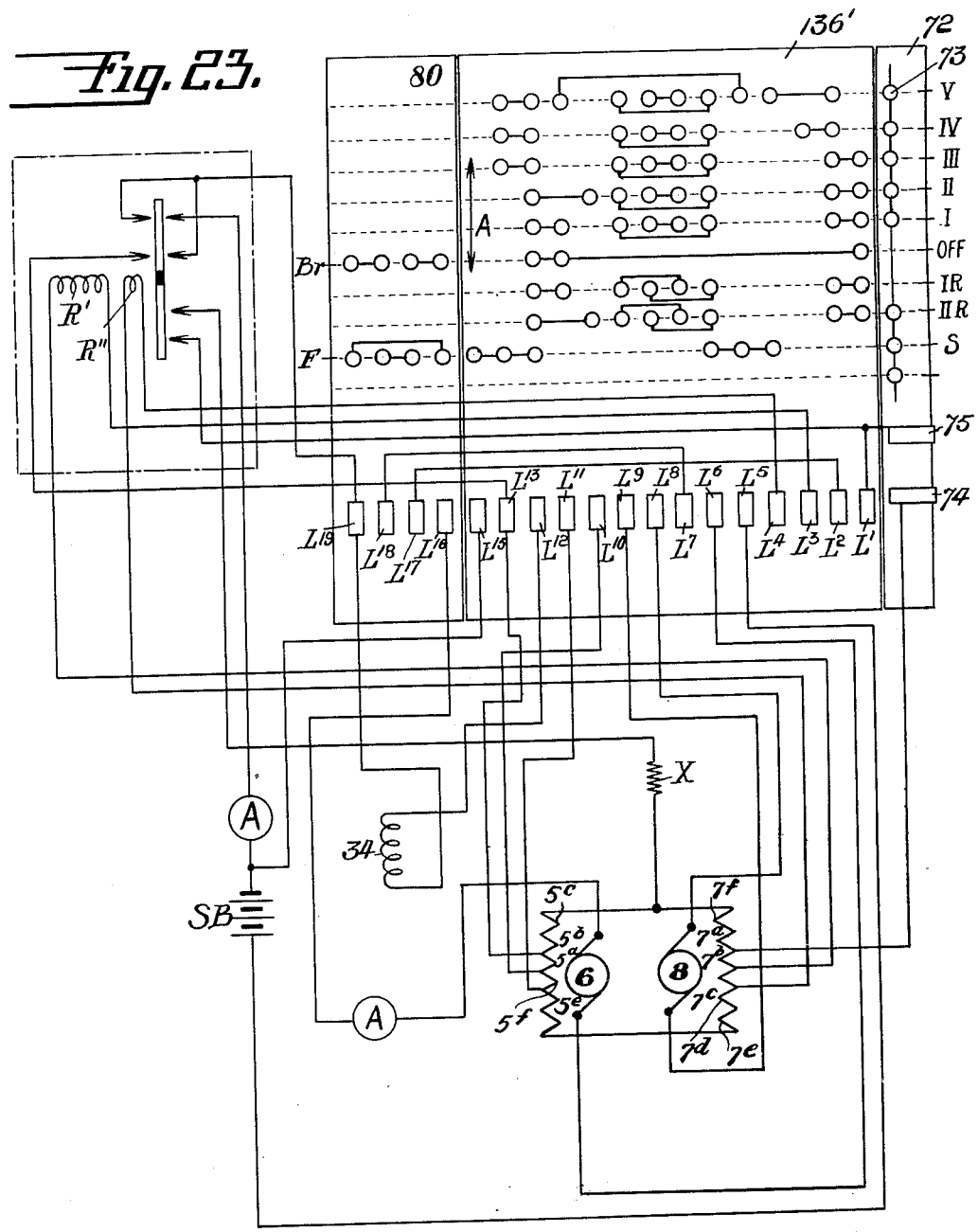

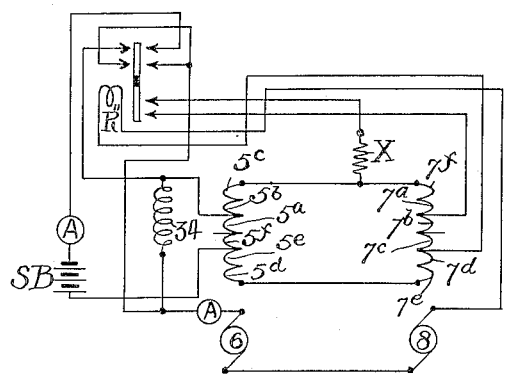
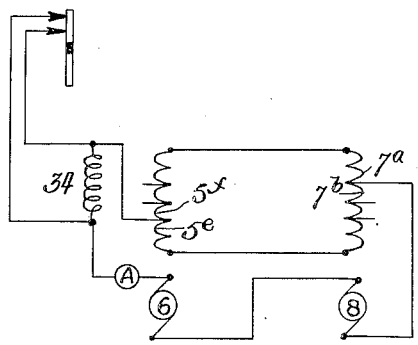
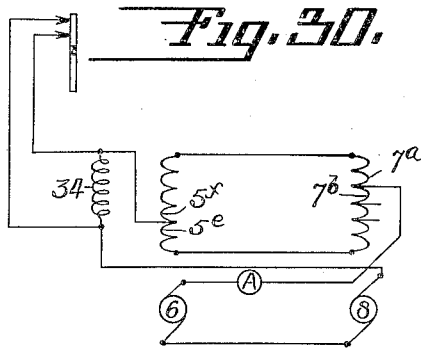
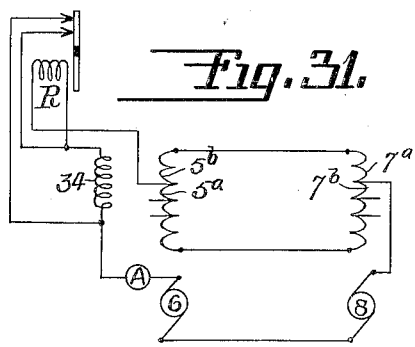
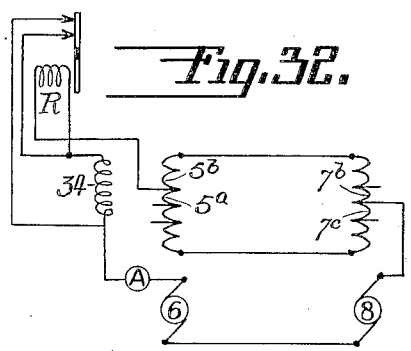
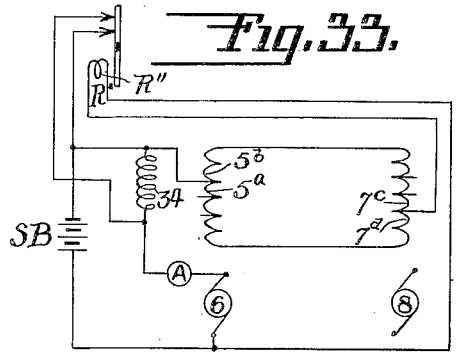

Patented Feb. 5, 1929.

1,700,780

UNITED STATES PATENT OFFICE.

HARRY L. TANNER, OF BROOKLYN, NEW YORK.

ELECTRODYNAMIC TRANSMISSION SYSTEM.

Application filed August 21, 1919, Serial No. 318,869. Renewed May 26, 1928.

This invention relates to electro-dynamic transmission systems. More specifically it relates to such systems primarily designed for use in transmitting power from an internal combustion engine or other prime mover to the load or driven element.

Systems of transmission have been proposed, in the prior art, which comprise an electric generator coupled to a prime mover and electrically connected to an electric motor mechanically coupled to the load. Such a system possesses marked advantages such for example as smoothness of drive in spite of uneven and pulsating engine torque, ease of control, etc. A generator motor transmission while satisfactory for short runs is wasteful of energy for long runs. In order to overcome this disadvantage it has been proposed to combine with the above outlined system some form of clutch for forming a direct connection between the electric generator and electric motor shafts for establishing a direct drive between the prime mover and load.

It has been proposed to utilize a friction clutch in the combination described. Such a clutch, while permitting slip on excessive loads, is disadvantageous in that the parts wear and must not only be frequently realigned but replaced from time to time. Interlocking mechanical clutches have also been proposed. This type while practically free from the wear which takes place in the friction type, does not pull out on excessive or dangerous loads so that damage to the system is apt to result.

It will also be noted that these mechanical clutches all possess the disadvantage of transmitting the engine pulsations to the driven element so that one of the principal features of a generator motor drive is lost.

One of the principal objects of this invention is to provide a system in which either a generator-motor drive may be employed or, as an aid thereto, a novel, non-slip, one-to-one drive in which the pulsations of the engine are not transmitted but absorbed and in which there is no friction or other mechanical connection between the drive and driven shafts.

A further object is to provide a compact form of magnetic torque applying device capable of transmitting large torques without frictional or other mechanical connection.

Another object is to provide novel features of control for systems of the class above outlined. Other objects and advantages will appear as the invention is hereinafter developed.

Referring to the drawings which illustrate what I now consider preferred forms of my invention:

Fig. 1 is a longitudinal elevation partly in section illustrating a preferred form of electro-dynamic transmission mechanism.

Fig. 2 is an elevation illustrating how the structure shown in Fig. 1 may be attached to the engine.

Fig. 3 is a fragmentary detail cross-section of a preferred form of electro-magnetic torque-applying device.

Fig. 4 is a wiring diagram of one form of electrical connections which may be employed in connection with the structure shown in Fig. 1.

Figure 5:
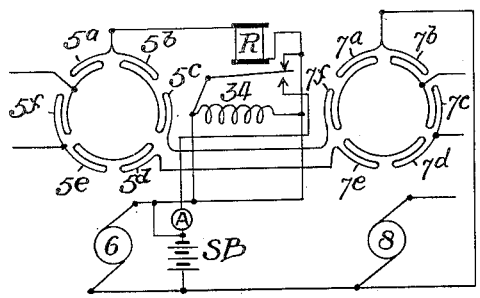

Figs. 5 to 12 inclusive are supplementary diagrammatic views illustrating the electrical relationship corresponding to various positions of the controller shown in Fig. 4.

Fig. 13 is a fragmentary elevation illustrating one form of my invention applied to an automobile, the latter being shown in dotted lines.

Fig. 14 is a detail section taken on the line 14—14 of Fig. 13.

Fig. 15 is a detail elevation of the structure shown in Fig. 14, looking in the direction of the arrow 15.

Fig. 15$^a$ is a detail elevation partly in section of a portion of the structure illustrated in Fig. 13.

Fig. 16 is a fragmentary detail elevation, partly in section, showing a modified form of controller operating means and Fig. 17 is a plan view of the same.

Fig. 18 is a detail end elevation of the controller shown in Fig. 16, with the casing removed.

Fig. 19 is a detail elevation illustrating one form of auxiliary controlling means employed in one form of my invention.

Fig. 19$^a$ is a similar view of a modification.

Fig. 20 is a wiring diagram illustrating a modified form of connections which may be employed in connection with the apparatus illustrated in Fig. 1.

Figs. 21 and 22 are diagrammatic views showing the electrical connections corresponding to two of the positions of the controller illustrated in Fig. 20.

Fig. 23 is a view similar to Fig. 20 but illustrating a further modification.

Figs. 24 and 25 are diagrammatic views showing the electrical connections corresponding to the first running point of the controllers shown in Figs. 20 and 23.

Figs. 26, 27, 28, and 29 are similar views corresponding to various other positions of the controller shown in Fig. 23.

Fig. 30 is a similar view showing the connections corresponding to the braking position of the controllers illustrated in Figs. 20 and 23.

Figs. 31 and 32 are similar views corresponding to third and fourth running positions of the controller shown in Fig. 20.

Fig. 33 is a view similar to Fig. 21 but relating to the controller shown in Fig. 23.

Fig. 34 is a detail showing an operating means for the drum 80 shown in Figs. 20 and 23.

Fig. 35 is a sectional detail of a modified form of electro-magnetic torque applying device.

While my system is capable of broader application I have illustrated it in connection with an automobile as it possesses numerous features especially valuable in this combination. Referring to Figs. 1, 2, and 13 it will be seen that the automobile 1 is provided with a heat engine 2 preferably of the internal combustion type. The shaft 3 of the latter, which I call the driving shaft, is adapted to be connected to the shaft 4, which I term the driven shaft, by instrumentalities hereinafter described. The last mentioned shaft is adapted to propel the vehicle through the usual connections, not shown. Calling attention to Fig. 1 it will be seen that I have illustrated a dynamo-electric machine G having a stationary field 5 and an armature 6 mechanically connected to the shaft 3 to be driven thereby or under certain conditions, as will hereinafter appear, to drive the same. A second dynamo-electric machine M has a stationary field 7 and an armature 8 mechnically connected to the shaft 4 to drive the same or under certain conditions, as will hereinafter appear to be driven thereby.

Under certain conditions a driving connection is formed between the shafts 3 and 4 by means of an electro-magnetic torque applying device. In order to make the transmission mechanism as compact and light in weight as possible I prefer to use the arrangement illustrated in Fig. 1. A sleeve 9 is secured to the shaft 3 by any suitable means such as bolts 10 passing through the flange 11 of said shaft and screwed into said sleeve. The armature 6 is secured to one end of said sleeve. As the dynamos are preferably of the direct current type a commutator 14 for the armature 6 is also secured to the sleeve 9 between shoulder 12 and nut 13 and is provided with cooperating brush holders 15 which may be mounted on the frame 16 in the usual manner. The field poles of the machine G are also fixed to said frame 16, the latter being of magnetic material so as to constitute the field yoke. The shaft 4 extends into the sleeve 9, suitable bearings 18 and 19 being provided between said elements 4 and 9 to permit relative rotation thereof. The shaft 4 is also journalled by means of a bearing 21 in the end-bell 20 bolted or otherwise secured to the frame 16. The poles of the field 7 of the machine M are mounted on the frame 16 as in the case of the machine G. The armature 8 is secured to the sleeve 22 bolted on a hub 23 which hub is keyed at 24 to the shaft 4. The commutator 25 of the armature 8 is shown secured to the hub 23 by means of the usual cone ring and nut connection. The brushes for the armature 8 are mounted in brush holders 26 secured to the end-bell 20.

The magnetic torque applying device previously referred to preferably comprises a series of annular members of non-magnetic material having inserts of steel or other magnetic material. While the specific construction of this clutch is described hereinafter in detail, it is not claimed herein per se, as it is obviously capable of being employed in other systems, but is claimed in my co-pending application, Serial No. 788,173 filed on or about June 1, 1920, which, therefore, to the extent indicated, is a continuation in part of this application. Calling attention to Figs. 1 and 3 it will be seen that two of these rings 27 and 28 are bolted or otherwise secured to the sleeve 9. Three similar annular members 29, 30, 31 are shown bolted to the hub 23. It will be noted that the annulus 29 surrounds the sleeve 9, the annulus 27 surrounds the annulus 29, the annulus 30 surrounds the annulus 27, etc. Each of these annular members is provided with steel or iron inserts 32 which extend in a direction parallel to the axis of the shaft 4 and sleeve 9 and are equi-distantly spaced in a circumferential direction. The number of inserts on any of the members is equal to the number of inserts on any other member. In order to increase the torque of the device that portion of the periphery of the sleeve 9 which extends into the member 29 may be grooved to provide teeth 32′ which correspond to the steel inserts in any one of the annular members both in spacing and in number.

While the fields of the machines G and M may be utilized for passing magnetic flux through the torque applying device I prefer to provide a magnetizing coil 34 for this purpose. This coil 34 is shown as surrounding the sleeve 9 being mounted on a ring 35 of non-magnetic material bolted or otherwise secured to the frame 16. The structure shown in Fig. 1 may be secured to the engine 2 by means of bolts 36′ which pass through the flange 37 of said frame 16.

If the shaft 3 is being driven by its engine and it is desired to drive the shaft 4, that is to propel the vehicle, suitable connections may be established between the machines G and M to cause the former to act as a generator to supply electrical energy to the machine M to drive the latter as a motor and thereby rotate the shaft 4. This arrangement may be utilized for driving the shaft 4, that is the vehicle, at low speeds and the electro-magnetic torque applying device T may be magnetized to establish the one-to-one drive connection between the shafts 3 and 4 for the high speed transmission. Various means may be adopted for varying the generator and motor connections in order to control the speed of said shaft 4. One form of such means is illustrated in the drawings and may be constructed substantially as follows.

Figure 7:
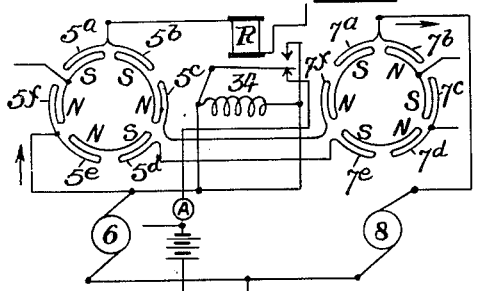
Figure 8:
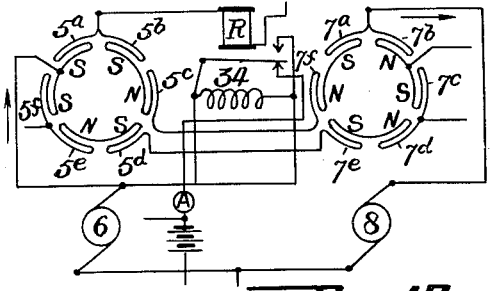
Figure 9:
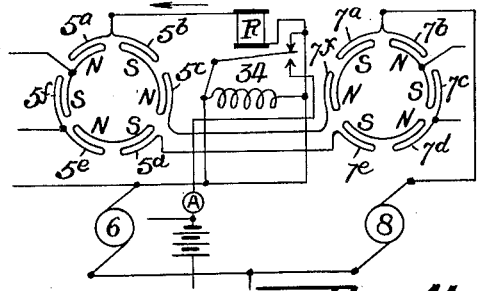
Figure 10:
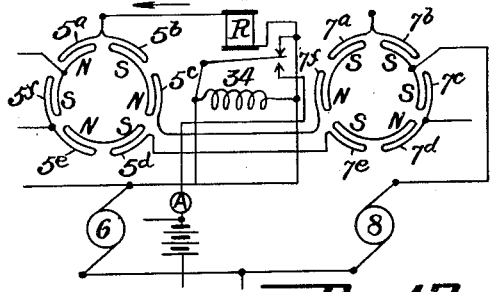
Figure 11:
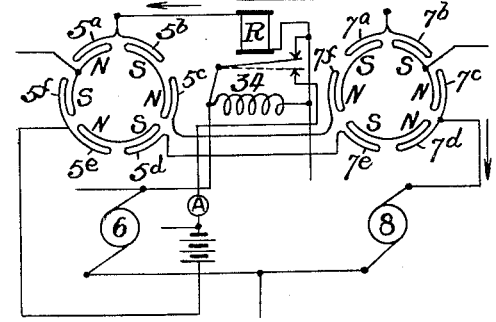

The field of the machine G is of the multipolar type being shown as having its poles each provided with a winding $5^a$ to $5^f$. The machine M is similarly constructed, the field windings or coils being designated $7^a$ to $7^f$. This arrangement is clearly illustrated in Fig. 4 of the drawings. Each of the machines G and M is provided with six brushes placed in a manner well known in the art. If the machine G is so connected that the windings $5^a$, $5^c$, and $5^e$ establish field poles of the same polarity and the windings $5^b$, $5^d$, and $5^f$ of the opposite polarity the machine will generate its maximum voltage assuming of course that the armature 6 is rotated by the engine. Furthermore, if the machine M is so supplied with electrical energy that the windings $7^a$, $7^c$, and $7^e$ establish poles of the same polarity and the windings $7^b$, $7^d$, and $7^f$ of the opposite polarity armature 8 will rotate at a comparatively low speed. The operation of the transmission system for low speed drives may be substantially as follows: For the lowest speed of shaft 4 the connections illustrated in Fig. 7 may be established. In this figure one terminal of the armature 6 is connected to one end of each of the windings $5^e$ and $5^f$. Two branch circuits are established between this point and one of the terminals of the armature 8. One of these branches comprises the windings $5^f$, $5^a$, $5^b$, $5^c$, $7^f$, and $7^a$ all in series while the other branch comprises the windings $5^e$, $5^d$, $7^e$, $7^d$, $7^c$, and $7^b$ all in series. The remaining terminals of the armatures 6 and 8 are connected to each other. It will be noted that the field poles magnetized by the windings $5^a$ and $5^f$ are reversed so that the machine G which is acting as a generator generates a comparatively low voltage so that the motor shaft 4 rotates at a comparatively low speed. The shaft 4 may be caused to speed up by establishing the connection shown in Fig. 8 which are the same as those in Fig. 7 except that one of the terminals of the armature 6 instead of being connected between the coils $5^e$ and $5^f$ is connected between the coils $5^f$ and $5^a$. The field pole magnetized by the windings $5^a$ is now the only one which is reversed so that the voltage generated by the machine G is higher than that corresponding to the connections illustrated in Fig. 7. To speed the said shaft 4 up still more the connections illustrated in Fig. 9 may be established in which one terminal of the armature 6 is connected between the field coils $5^a$ and $5^b$ instead of as shown in Figs. 8 or 7. All of the field poles energized by the coils $5^a$, $5^c$, and $5^e$ are now of one polarity while the remaining poles are of the opposite polarity. The machine G, therefore, is connected to generate its maximum voltage. In order to speed the shaft 4 up still more the field connection of the machine M may be varied as indicated in Fig. 10. In this figure one terminal of the armature 8 instead of being connected between coils $7^a$ and $7^b$ is connected between coils $7^b$ and $7^c$. This reverses the polarity of the field pole energized by the coil $7^b$ causing the counter-electromotive force of the machine M to decrease thereby causing the armature 8 to speed up. The speed of the shaft 4 may be brought up still higher by reversing another of the field poles of the machine M by establishing connections such as illustrated in Fig. 11. In this figure the connection between the field and armature of the machine M is changed so that the armature terminal is connected between the coils $7^c$ and $7^d$ causing two of the field poles of the machine M to be reversed thereby speeding the armature of the machine M up. The design is preferably such that when the connections illustrated in Fig. 11 are established the ratio of the speed of shaft 4 to that of shaft 3 will be a maximum. Or, in other words, the speed of the shaft 4 will exceed that of the shaft 3.

In order to minimize the losses which take place in the transmission system on long run, high speed drives I prefer to call the electro-magnetic torque applying device T into action to assume the major portion of the load when the connections illustrated in Fig. 11 are established. Referring to the last mentioned figure it will be seen that I have shown a relay R connected in series between the armature 6 and the field winding of the machine G. This relay is provided with front and back contacts, the former being connected across the coil 34 which is connected in series with said relay R. The design of this relay is such that so long as the current therethrough exceeds a predetermined value the front contacts are closed and the coil 34 short-circuited. If, however, the current through the relay drops below a predetermined value the relay armature is drawn away from the front contact by its spring thereby breaking the short circuit across the coil 34. When the connections shown in Fig. 11 are established the shaft 4 assumes a speed higher than that of the shaft 3 for reasons already explained. If the current through the relay R should now be reduced, as for example by throttling down the engine 2 or by the vehicle traveling down grade, the said relay will release its armature causing the winding 34 to be inserted into the generator motor circuit. This reduces the current flowing between the two machines so that the speed of the shaft 4 will be reduced and drop through that of the shaft 3. At, or near the time when the ratio of speeds of said two shafts is substantially one-to-one the flux set up by the coil 34 through the path described below will cause the magnetic torque applying device T to become operative and establish a non-slip drive connection between said shafts. Energization of said coil 34 causes magnetic flux to flow through the sleeve 9, teeth 32′, teeth 32, armature 8, the field of the machine M, frame 16, the field of the machine G, armature 6, and thence into the said sleeve 9. It will be noted that the motor M is not disconnected at this time but still acts to assume a portion of the load.

A storage battery SB may be charged by the generator G when the electro-magnetic torque applying device is called into action. one form of connections for accomplishing this function being illustrated in Fig. 11. One terminal of the storage battery is connected through an ammeter to the back contact of relay R, the other terminal of said battery being connected between the field windings $5^e$ and $5^f$ of the generator. The theory of operation in connection with charging this battery will be clearly understood in view of the description of the remaining forms of the invention.

The machine G may be employed as a motor to start the engine by establishing the connections shown in Fig. 5 in which the storage battery SB is connected across the armature 6. One terminal of the last mentioned armature is connected through the relay R to the junction of windings $5^a$, $5^b$, the connections between the field windings of the two machines G and M being the same as those illustrated in Figs. 7, etc. The junction of the field coils $7^a$ and $7^b$ is connected directly to terminal of the armature 6 opposite to the one connected to the field windings $5^a$, $5^b$. It will be seen that the armature 8 is not in the circuit so that the machine M is idle. With the connections made as described the storage battery SB supplies energy to the machine G to drive the latter as a motor with a comparatively strong field to start the engine.

It will be noted that in addition to the short circuit across coil 34 described above there is an additional short circuit except when the connections shown in Fig. 11 are established. In other words it is only when the highest speed running connections are established that the coil 34 may be energized.

Figure 6:
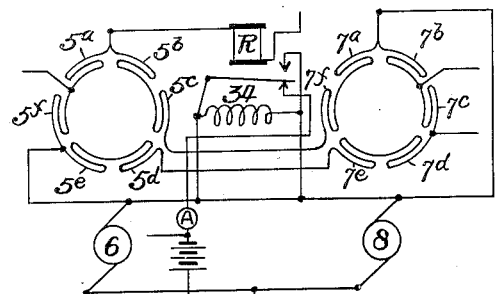

The controller illustrated in Fig. 13 at C may be employed to establish the connections illustrated in Figs. 5 to 11 inclusive. The controller comprises a drum 36 having conducting segments $S^1$ to $S^6$, shown in development in Fig. 4 and two sets of brushes $B^1$ to $B^6$ and $b^1$ to $b^6$. The brush $B^2$ is connected to one terminal of relay R, the remaining terminal of which is connected to the junction of the field windings $5^a$ and $5^b$. The field windings of the machines G and M are connected to each other permanently as shown and as previously described. The brush $B^1$ is connected to one terminal of the storage battery SB which same terminal is connected to the back contact of relay R through the ammeter shown. The remaining terminal of the storage battery is connected to the brush $b^6$. The brush $B^3$ is connected to the front contact of the relay R and the brush $B^4$ is connected to one terminal of the armature 6 and to the armature of the relay R. The remaining terminal of the armature 6 is connected to the brush $b^5$ and to one of the terminals of the armature 8 The other terminal of the armature 8 is connected to the brush $b^3$ The brush $B^5$ is connected to the junction of field coils $5^e$ and $5^f$, and the brush $B^6$ is connected to the junction of the field coils $5^f$ and $5^a$. The coil 34 is connected across the front contacts of the relay R. The brush $b^4$ is connected to the junction of the field coils $7^a$ and $7^b$; the brush $b^1$ is connected to the junction of the coils $7^c$ and $7^d$; and the brush $b^2$ is connected to the junction of the coils $7^b$, $7^c$. With the exception of the following connections the segments $S^1$ to $S^7$ are insulated from each other. The segments $S^1$, $S^6$ are permanently electrically connected to each other as are also the segments $S^2$, $S^4$. The controller drum 36 is movable so as to bring the portions indicated by vertical lines S, O, I to V into contact with the corresponding rows of brushes $B^1$ to $B^6$ and $b^1$ to $b^6$. The "off" position is indicated at O and when the brushes are in this position with relation to the drum 36 the connections illustrated in Fig. 6 are established. In this position not only the coil 34 is short-circuited but the fields of the machines G and M as well so that the transmission system is idle and no torque is transmitted. On position I of the drum 36 the connections shown in Fig. 7 are established to cause the machine G to act as a generator to drive the machine M as a motor at low speed as previously explained. Positions II to V inclusive of the controller drum establish the connections shown in Figs. 8 to 11 inclusive, respectively. By moving the controller drum to position S the connections shown in Fig. 5 may be established to rotate the engine, employing the machine G as a motor supplied from the battery SB.

Figure 12:
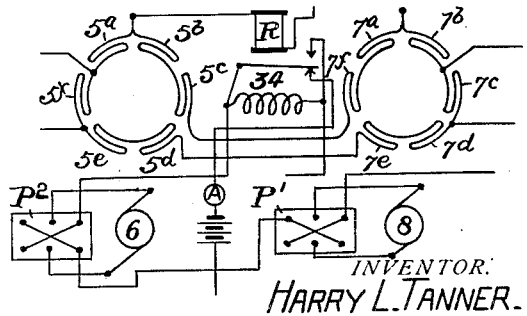

By placing a reversing switch between the brushes of the armature 8 and the leads thereto, as indicated at $P^1$ in Fig. 12, the machine M may be operated as a motor in either direction to propel the automobile either forwards or backwards at any of the speeds corresponding to positions I to IV of the drum 36 depending on the position of said switch P¹ and said drum.

If, in addition to placing the switch P¹ in the reverse position the armature 6 is reversed with respect to its field, as for example by means of the switch P² shown in Fig. 12, the machine M may be caused to be driven by the momentum of the automobile to act as a generator to supply energy to the machine G to cause the latter to act as a motor to drive the engine 2. A considerable braking torque may thereby be exerted to stop the automobile by placing the drum 36 on any one of positions I to IV and operating switches P¹, P² as above described. It will be understood, of course, that the switches P¹, P², or means equivalent thereto are to be employed in connection with the system illustrated in Fig. 4, these switches being omitted from the last mentioned figure to avoid confusion. The switch P² may be located at any convenient place on the automobile 1 as for example within a casing P²′ shown in Fig. 13 in which the switch operating handle is indicated at H.

Any suitable form of means may be employed to operate the drum 36, of the controller C, and the switch P¹. The means illustrated in Figs. 13, 14, 15, 15ᵃ will, however, be found to possess marked advantages. The drum of the controller C is mounted on a shaft 40 to be rotated thereby, said shaft being suitably journaled on the automobile 1. The shaft 40 has secured thereto a beveled gear 41 which meshes with beveled sector 42 secured to a sleeve 43. The latter is adapted to be rotated by a sleeve 44 slidable but non-rotatable with respect thereto as clearly indicated in Fig. 15ᵃ. The sleeve 44 extends through the usual fixedly mounted steering column 45. The members 44 and 45 are made in the form of a sleeve so that the usual steering throttle and other control members may extend therethrough. The steering wheel is shown at 46. The sleeve 46′ has secured thereto, at its upper end, a handle or lever 47 and it will be obvious that the drum 36 of the controller C may be placed in its various positions by turning this handle in one direction or the other.

One form of switch P¹, shown diagrammatically in Fig. 12, is shown in Fig. 15ᵃ as comprising sleeves 48, 49, and 50 and brushes 51 to 54. The sleeves 48, 49, and 50 are secured to but insulated with respect to the sleeve 44 and the sleeve 49 is insulated with respect to the sleeves 48, 50 which are electrically connected. Brushes 51, 52, 53, and 54, each insulated with respect to the others are mounted on the column 45 in a position to cooperate with the sleeves 48, 49, and 50. Brushes 51 and 53 are connected to the armature 8 while brushes 52, 54 are connected to the brushes $b^5$ and $b^3$, respectively. When the sleeve 44 is in its uppermost position, as indicated in Fig. 15ᵃ, the brushes 51 and 52 are bridged by sleeve 50 and the brushes 53 and 54 by the sleeve 49. These connections will cause the vehicle to travel forward if the handle 47 is turned so as to place the controller on a running point. If the sleeve 44 is moved downwardly the brush 54 is engaged by the sleeve 48, brushes 52, 53 are bridged by the sleeve 49, and the brush 51 remains in contact with the sleeve 50. The armature 8 is thus reversed so that if the arm 47 is rotated to place the controller C on a running point the automobile will travel backwards as the shaft 4 will now rotate in a direction opposite to that of the engine shaft 3. The sleeve 44 may be biased to its upper position by means of a spring 56 which seats at opposite ends against the gear segment 42 and a collar 55 secured to said sleeve 44.

In order to aid the operator in manipulating the handle 47 to effect the various controls the structure shown in Figs. 13, 14, and 15 may be employed. A plurality of arc-shaped members 57, 58, 59 are secured to the column 45 by means of brackets 60 so as to form a plurality of slots or guide openings 61, 62. These slots communicate at only one position, i. e. at a position under the "off" position of the handle 47. The upper member 57 may be provided with notches 63 adapted to be engaged by a dog or pawl 64 on the handle 47 in order releasably to hold the latter in its various positions.

The complete operation may be summarized as follows. If it is desired to start the engine the handle 47 should be shifted to the left to the starting or "S" position. This places the drum 36 on position "S" (see Fig. 4) to establish the connections shown in Fig. 5, which causes the battery SB to drive the machine G as a motor to spin the engine. As soon as the engine runs under its own power the handle 47 may be returned to the "off" position as indicated in Figs. 14 and 15. If it is desired to start the automobile forward the handle 47 may be moved to the right to position I which establishes the connections illustrated in Fig. 7. The machine G then acts as a generator to supply machine M as a motor to drive the vehicle at low speed. The car may be accelerated by successively placing the handle 47 at positions II to IV to establish the connections illustrated in Figs. 8 to 10 inclusive. On all of the positions except position V the coil 34 is short-circuited at the controller drum 36 so that the electromagnetic torque applying device cannot become operative until the handle 47 is placed on position 5 regardless of the condition of the relay R. When the handle 47 is placed on position V the connections illustrated in Fig. 11 are established to cause the motor M to speed its shaft up faster than the shaft 3 of the engine. The electro-magnetic torque applying device T may or may not become operative when the handle 47 is placed on position V depending on the conditions existing at that time. If, for example, the vehicle is climbing a more or less heavy grade the current through the coil of the relay R will not drop sufficiently to permit the armature thereof to disengage the front contact so that a short circuit will still exist across the coil 34. If, however, the current through the relay R drops sufficiently to permit the relay armature to be released, for example if the machine is going down hill, or traveling on the level and the engine is throttled down, the short circuit across the coil 34 is broken. The coil 34 is then in series with the machines G and M so that by virtue of the resistance of said coil the speed of the machine M is reduced. At, or near the time when the speed of the shaft 4 approaches or drops through that of the shaft 3 the device T becomes operative to establish a one-to-one, non-slip, non-mechanical drive ratio between the shafts 3 and 4. It should be noted that although at this stage of the operation the device T assumes the major portion of the load the machine M acts as a motor to assume a portion thereof. In other words the current employed to charge the battery SB and to energize coil 34 passes through the machine M which is acting as a motor.

If it is desired to reverse the vehicle the handle 47 must be restored to the "off" position when it may be depressed to operate the reversing switch 49 to 54 so that on moving the handle 47 to the right in slot 62 the machine M will be driven in reverse direction to run the vehicle backwards. It will be noted that slot 62 is so designed as to limit the reverse speeds to two, I and II, which are deemed sufficient for all practical purposes.

If the automobile is traveling forward and it is desired to brake the same, the switch P² should be reversed by means of its operating member H and the handle 47 placed on a reverse position in slot 62. The machine M will then be driven by the vehicle to act as a generator to supply current to and drive the machine G as a motor to drive the engine 2. This action causes a comparatively high braking torque to be exerted on the drive wheels of the vehicle.

The electrical connections and controller operating means for the mechanism illustrated in Fig. 1 may assume various forms other than those described above. Thus, the main controller may be designed to effect reversal of the machine M to drive the automobile 1 backwards. In this case the sliding connection between the sleeves 43, 44 (see Fig. 15ª) may be omitted as may also the reversing switch 48 to 54. In other words, the controller-operating means may assume the form illustrated in Figs. 16 and 17 in which the elements C, 40, 41, 42, 43, and 45 will at once be recognized. The sleeve 43 has secured thereto adjacent the upper end a handle or operating member 147 corresponding to the handle 47 in Figs. 13 to 15. An annular plate 157, secured with respect to the steering column 45 above the steering wheel may be provided with indicia symbols to indicate the various positions at which the arm 147 should be positioned.

I prefer so to design the controlling system as to cause the automobile to travel forwardly when the handle 147 is moved from the "off" position in one direction and to cause the automobile to travel backwards when said handle is moved in the opposite direction from the "off" position. I prefer also to cause the machine G to act as a motor to start the engine 2 when the handle 147 is moved to its extreme position in the direction in which it causes reversal of the automobile. The plate 157 in Fig. 17 shows that there are five speeds forward, two reverse, and the controller 147 is moved through the reverse positions to reach the starting position "S". I provide automatic means for breaking the circuit between the machines G and M when the handle 147 is moved from the starting position through the reverse positions to the off position in order to prevent the vehicle being driven backwards unintentionally. One form of such means is shown in Fig. 18 and diagrammatically in Fig. 20.

The main drum of the controller C, which is designated 136 in this form of the invention, is secured to the shaft 40 to rotate therewith. The drum 136 carries a pin 70 which extends through a slot 71 provided in a disc or drum 72 rotatably mounted on the shaft 40 adjacent one end of the said drum 136. The disc 72 carries a conducting segment or band 73 which is continuous, except at 76, and is adapted to bridge relatively stationary brushes 74, 75. As will be later apparent the circuit between the field and armature 8 of the machine M is interrupted when the brushes 74, 75 are not bridged by the segment 73.

The operation of this portion of the invention is as follows. When the handle 147 is on the "off" or any of positions I to V the pin 70 occupies a position at the end of slot 71 opposite to the end in which the pin is shown in Fig. 18. If the handle 147 is moved from any of positions I to IV or "off" in reverse direction the pin 70 travels to the other end of the slot 71 as shown in Fig. 18. In the last mentioned figure the parts are shown in the position they occupy when the handle 147 is moved toward the "S" position but only up to the second reverse point. It will be noted that the brushes 74, 75 are bridged by the segment 73. When the handle 147 is moved to the "S" position the disc 72 is rotated to such an extent that the brush 74 is no longer engaged by the segment 73. When the handle 147 is now moved from the "S" position toward the "off" position the drum 136 is rotated but the disc 72 remains stationary as the pin moves idly in the slot 71 until the reverse points of the controller are passed. At this time the pin has traveled the full length of the slot so that before the "off" position is reached the disc 72 is actuated to cause the segment 73 again to bridge brushes 74, 75. In short, the brushes 74, 75 are bridged by the segment 73 except when the handle 147 and drum 136 are on the two reverse positions, moving toward "off" position after having been in the "S" position.

As explained, in Fig. 4 there are two short-circuiting paths around the coil 34, one controlled by relay R and the other by the controller drum 36. I prefer, however, to employ only one of such paths, i. e. the one controlled by the relay R, and to render the relay ineffective to release its armature unless the controller is on the fifth forward running point. This may be accomplished by means of the structure shown in Fig. 19.

The shaft 40, to which the main drum 136 is secured, has secured thereto a cam 77 adapted to cooperate with a roller 78 carried by the relay armature. The design is such that when the drum 136 is on any other than position V the cam holds the armature against the front contacts against the action of the spring 79. When position V is reached the cut-away portion of said cam comes opposite the roller 78 so that the relay R may then exercise control over its armature in the manner previously described.

One form of connections for the transmission shown in Fig. 1 and employing the controlling means, illustrated in Figs. 15 to 19, is shown diagrammatically in Fig. 20. The members R, SB, 6, 8, $5^a$ to $5^f$, $7^a$ to $7^f$, 72, 73, 74, 75, and 34 will at once be recognized. The controller drum 136 is shown diagrammatically in development, as are also segment 73 and a reversing drum 80 for braking purposes. The controllers are movable in the direction of the arrow A. Besides the brushes 74, 75, previously described, there are provided a set of stationary brushes $L^1$ to $L^{15}$ for the drum 136 and a set of brushes $L^{16}$ to $L^{19}$ for the drum 80. The connections of the field coils $5^a$ to $5^f$ and $7^a$ to $7^f$ to each other is identical to the connections in Fig. 4.

One of the lower set of back contacts of the relay R (shown in detail in Fig 19) is connected to a resistance X while the other is connected to the brushes 75 and $L^1$, the other end of the resistance X being connected to the junction of field coils $5^c$ to $7^f$. The brush $L^2$ is connected to the brush $L^{17}$. The brush $L^3$ is connected to the junction of the field coils $7^b$ and $7^c$, and the brush $L^4$ is connected to the junction of the field coils $7^c$ and $7^d$. The brush $L^5$ is connected to one terminal of the battery SB the other terminal of which is connected to the brush $L^{15}$ and through an ammeter to one of the upper set of back contacts of the relay R. The other of the last mentioned set of contacts is connected to the brushes $L^{19}$ and $L^{13}$ and to one of the front contacts of the relay R. The other of the last mentioned contacts is connected to the brush $L^{12}$, and the coil 34 is connected across said brushes $L^{12}$, $L^{13}$. The armature 6 is connected in series with an ammeter across the brushes $L^6$ and $L^{16}$ and the armature 8 is connected across the brushes $L^8$ and $L^9$. The brushes $L^7$ and $L^{18}$ are connected to each other, and the brush 74 is connected to the junction of field coils $7^a$ and $7^b$. The brush $L^{10}$ is connected to the junction of the field coils $5^f$ and $5^a$ and the brush $L^{11}$ is connected to the junction of the coils $5^f$ and $5^e$. One terminal of the coil R is connected to the brush $L^{14}$ while the other terminal is connected to the junction of the field coils $5^a$ and $5^b$.

Assuming that the drum 80, which may be operated by any suitable means, is in the proper position and that the controller drum 136 is on the "S" position the connections illustrated in Fig. 21 are established. These connections are substantially the same as those illustrated in Fig. 5 and as explained in connection with that figure the battery SB will supply current to the machine G to cause the latter to act as a motor to turn the engine 2 over. When the main controller is on the "off" position the circuit through armature 6 and the fields of machines G and M is broken so that the transmission cannot operate. When the drum 136 is placed on position I the connections illustrated in Fig. 24 are established to cause the machine G to act as a generator to drive the machine M as a motor at a low speed, as explained in connection with Fig. 7. It should be borne in mind that the front contacts of the relay R are closed by cam 77 (Fig. 19) and the coil 34 is thereby short-circuited at all times except when the drum 136 is on position V. When the drum 136 is placed on position II the connections shown in Fig. 25 are established. It will be noted that the armature 6 is connected to the junction of the field coils $5^a$ and $5^f$ instead of to the junction of field coils $5^f$ and $5^e$ so that the voltage of the machine G increases to drive the automobile 1 forward at increased speed, as explained in connection with Fig. 8. When the drum 136 is placed on position III the connections illustrated in Fig. 31 are established to cause the vehicle to travel at a higher speed, as explained in connection with Fig. 9 and when said drum 136 is placed on position IV the connections illustrated in Fig. 32 are established to cause the vehicle to travel at a still higher speed, as explained in connection with Fig. 10. When the controller is placed on position V the connections shown in Fig. 22 are established to cause the system to operate as explained in connection with Fig. 11. It should be noted that in Fig. 22 the relay R is rendered effective to control the coil 34 by virtue of the release position of the cam 77 (see Fig. 19) while in Fig. 11 said relay is rendered effective to control said coil 34 by virtue of the interruption of the other controller-governed short-circuit across said coil.

Assuming that the engine is running and the controller is on any of positions I to V or "off," the vehicle 1 may be caused to travel backwards at either of two speeds by placing the drum 136 on I R or II R. Placing the controller on I R establishes the connections illustrated in Fig. 29 which are the same as those in Fig. 24 except that the connections of armature 8 are reversed and the latter runs in the reverse direction. On position II R the connections are the same as those illustrated in Fig. 25 except that armature 8 is reversed.

If it is desired to brake or check the momentum of the vehicle the drum 136 should be placed on any of the positions I to V and the drum 80 placed in its other position. This reverses both sets of fields 5 and 7 with respect to their respective armatures 6 and 8. The machine M then acts as a generator to drive the machine G as a motor to drive the engine 2 thereby to impose a braking torque on the vehicle. Fig. 30 illustrates the connections when the drum 136 is on I and the drum 80 is thrown to reverse position.

When the drum 136 is placed on position V and the relay R releases its armature, connections are established to charge the battery SB. While various forms of connections may be employed I prefer to employ those illustrated. It will be noted that when the drum 136 is placed on position V the armature 6 is connected (through the relay R or relay R and coil 34) to the junction of field coils $5^a$ and $5^b$ and the armature 8 is connected to the junction of the field coils $7^c$ and $7^d$. This means that, disregarding the battery connection, the field of the machine G is connected to cause the maximum voltage to be generated whereas two of the field coils of the machine M are reversed, i. e. coils $7^b$, $7^c$. When the armature of relay R engages its back contacts the battery is connected across the upper terminal of the armature 6 and the junction of the field coils $5^f$ and $5^e$. When the controller drum 136 is on position V and the armature of relay R remains in engagement with its front contacts a circuit is established from armature 6 through brush $L^{16}$, brush $L^{19}$, the armature and front contacts of relay R, brush $L^{12}$, brush $L^{14}$, relay R, the generator motor fields, brushes $L^4$, $L^2$, $L^{17}$, $L^{18}$, $L^7$, $L^8$, armature 8, brush $L^9$, brush $L^6$, and back to armature 6. When the armature of said relay R engages its back contacts current flows from armature 6 through brush $L^{16}$ to brush $L^{19}$, where the current divides. Part of the current then flows from brush $L^{19}$ through brush $L^{13}$, coil 34, brushes $L^{12}$ and $L^{14}$, relay R to the generator field between poles $5^a$ and $5^b$, thence through the generator and motor fields, brushes $L^4$, $L^2$, $L^{17}$, $L^{18}$, $L^7$, $L^8$, armature 8, brushes $L^9$ and $L^6$, and back to armature 6. Another part of the current flows from brush 19 through the armature of relay R, storage battery SB, brushes $L^5$ and $L^{11}$, to the generator field between poles $5^e$ and $5^f$, thence on through the generator and motor fields and back to armature 6 by the path above described. It should be remembered that when the charging connections are formed the armatures 6 and 8 are constrained to operate at the same speed by virtue of the magnetic torque applying device T. In other words, the machines G and M may be said to act as one machine having two armatures on the same shaft and two fields, so far as the charging function is concerned. The armature 8 develops a C. E. M. F. which opposes and reduces the E. M. F. of the machine G to hold the battery-charging current down.

It will be apparent that the machines may be so designed that for a given speed of the engine the effective charging voltage will be of such a value as to cause the proper amount of charging current to flow through the battery SB. If, however, engine 2 (consequently the armatures 6 and 8) speeds up the E. M. F. and C. E. M. F. will increase in the same ratio resulting in an increase in the E. M. F. for charging the battery. This will cause an increase in charging current which will weaken sections $5^a$ and $5^f$ of the generator field and strengthen sections $7^d$ and $7^e$ of the motor field, thus bringing the battery charging E. M. F. back to normal. As the machines may be so designed that a small change in battery current will cause a large change in the E. M. F. of the generator and of the motor the battery charging current will remain substantially constant. In order to effect the last described design without interfering too materially with the design desired in the system for accomplishing the other functions of power transmission and speed control, a shunt resistance X may be provided with such connections as to be rendered operative only when the charging connections are formed. This resistance may be connected, as shown, in series with a pair of back contacts of the relay R and across the field coils $7^f$, $7^a$ of the machine M. When controller drum 136 is in position V and the armature of relay R engages its back contacts current can thus flow from the generator field through resistance X, the back contacts connected therewith by the armature of relay R, and brushes 75 and 74 to the motor field between coils $7^a$ and $7^b$. In other words, when the armature of relay R engages its back contacts a shunt circuit through resistance X is completed around coils $7^a$ and $7^b$ of the motor field.

The charging current of the battery SB may be held more nearly constant by utilizing a resistance X having a fairly high positive temperature coefficient, for example iron wire. With such a resistance if the charging current rises above its desired value the current through the said resistance increases to cause an increase in temperature and resistance of the latter. This means that a greater proportion of the total current will flow through the coils $7^f$, $7^a$ so that the C. E. M. F. of the machine M will rise very rapidly compared to the rise in E. M. F. of the machine G. When the charging current decreases the temperature and resistance of X decreases so that a smaller proportion of total current flows through coils $7^f$, $7^a$, so that the C. E. M. F. of machine M will drop very rapidly compared to the drop in E. M. F. of machine G. In either event the charging current is held practically constant.

The operation of the form of invention shown in Figs. 16 to 20 may be summarized as follows. The engine 2 may be started by placing the handle 147 on position "S". After the engine is running the control member may be restored to "off" position. Although it is necessary to pass through the positions II R and I R to attain the "off" position from position "S" the vehicle will not travel backwards at this time due to the fact that the connection between the armature 8 and the junction of the coils $7^a$ and $7^b$ is open at brushes 74, 75 as previously explained. With the engine 2 running and the control member 147 in the "off" position the vehicle 1 may be caused to travel forward at any one of five successively increasing speeds by placing said handle on any one of positions I to V. Or, if the member 147 is on any of the positions "off" or I to V the vehicle may be caused to travel backwards at a comparatively low speed by placing said member on position I R. A higher reverse speed may be reached by placing said control member on position II R.

When the handle or arm 147 is on any one of said positions I to V the machine G acts as a generator to supply the machine M as a motor. On position V the electro-magnetic torque applying device T may or may not be called into operation depending on other conditions previously described. If said device T is called into operation on position V it assumes the major portion of the load but is aided by the machine M acting as a motor.

If it is desired to brake or check the momentum of the automobile 1 the handle 147 is placed on any one of positions I to V and the controller 80 is operated by any suitable means to reverse the connections of the fields 5 and 7 with respect to their respective armatures 6 and 8. The battery SB supplies energy to start the engine 2 on position "S" and is charged when the electro-magnetic torque applying device T is called into operation. It will be understood, of course, that this battery may also be employed for supplying the lighting and ignition and other circuits common to automobiles.

In both of the systems illustrated in Figs. 4 and 20 the electro-magnetic torque applying device T becomes operative on position V provided the current through the relay R is below the predetermined amount. The speed of the shaft 4 of the machine M exceeds that of the shaft 3 on position V, and, as previously explained, drops through the speed of the last mentioned shaft when the relay R releases its armature. This arrangement is adopted, among other reasons, to insure that the device T will become operative as the pull-in torque of the latter is much lower than the hold-in torque. In the arrangement shown in Fig. 23 the device T may, however, become operative when the speed of the shaft 4 is lower than that of shaft 3, as for example the speeds corresponding to position IV, provided that the load on the shaft 4 is not too great at the time.

If it is desired to permit the electro-magnetic torque applying device T to become operative on position IV as well as position V of the controller the connections illustrated in Fig. 23 or equivalent connections may be adopted. The system illustrated in this figure is identical to that shown in Fig. 20 except for the following changes.

The drum 136' has a different number of conducting segments connected in a different manner than those of the drum 136. The single winding relay R is replaced by a two coil relay R', R'' and the brush $L^{14}$ is omitted. The coil R' is inserted in the connection between the brush $L^3$ and the junction of the field coils $7^b$ and $7^c$ and the coil R'' is inserted in the connection between the brush $L^4$ and the junction of the field coils $7^c$ and $7^d$. The brush $L^{12}$ is not connected to the lower front contact of the relay R', R'' but the last mentioned front contact is connected to the brush $L^{13}$. Said brush $L^{13}$ is also connected to the junction of the field coils $5^a$ and $5^b$ but not to brush $L^{19}$ nor to coil 34. The brush $L^{19}$ is also connected to the coil 34. The elements 72, 80, and 136' are designed to be operated by the same means employed to operate the elements 72, 80, and 136 shown in Fig. 20, these operating means being shown in Figs. 16, 17, and 18.

Instead of the armature of the relay R', R'' being held against the front contacts in all positions except V (as is the case in the structure shown in Fig. 19) the cam 77' (Fig. $19^a$) is so designed as to permit the said armature to close on its back contacts on either of positions IV and V.

When the drum 136' is placed on the "S" position the electrical connections shown in Fig. 33 are established to spin the engine.

These connections are so similar to those in Fig. 21, previously described, that the operation will be readily understood without further description. When the handle 147 is moved from S towards "off" the reverse positions I R and II R are idle as explained in connection with Fig. 20. On the "off" position connections substantially the same, in an electrical sense, as those shown in Fig. 6 are established, the fields of the machines G and M being short-circuited. When the handle 147 and consequently the drum 136' are placed on position I the connections shown in Fig. 24 are established and when the drum 136' is placed on position II the connections shown in Fig. 25 are established. The operation resulting from these connections has already been described, position I causing the machine G to act as a generator to supply machine M as a motor to drive the shaft 4 at a comparatively low speed. On position II the speed of the shaft IV increases. On position III the connections shown in Fig. 26 are established to cause the motor shaft M to speed up as explained in connection with Fig. 31. It will be noted that except for the fact that the coil of the relay R is omitted in Fig. 26 the two Figs. 26 and 31 are identical.

When the drum 136' is placed on position IV the connections shown in Fig. 27 are established. Except for the fact that the relay coil R is omitted and the coil R' is inserted in the connection between the armature 8 and the field coils $7^b$, $7^c$, this figure is identical to Fig. 32. It will be clear, therefore, that the shaft 4 of the machine G will speed up higher than on position III. It should be noted, however, that whereas in the system shown in Figs. 19 and 20 the relay armature is held closed against the front contacts by the cam 77 on position IV, in the system illustrated in Figs. 19$^a$ and 23 the cam 77' releases said armature. In other words, on position IV of drum 136' the relay armature will engage its back contacts and disengage the front contacts if the current in the coil R' is below a predetermined amount. The coil R' is designed to release its armature on a current considerably below that on which the relay coil R or the coil R'', hereinafter described, release the armature. For example, if the coil R'' releases the armature at say 15 amperes the coil R' will release its armature at about 5 amperes. If conditions of travel and operation are such that the relay R' releases its armature the coil 34 is energized to cause the electro-magnetic torque applying device to pull-in and to assume the major portion of the load on position IV.

When the drum 136' is placed on position V the connections illustrated in Fig. 28 are formed. Here instead of connecting a relay coil R between the armature 6 and field of machine G, as shown in Fig. 22, a relay coil R'' is inserted between the armature 8 and field of machine M. The operation resulting from the connections shown in Fig. 28 is substantially the same as that described for position V of controller 136 and shown in Fig. 22.

If it is desired to reverse the vehicle the drum 136' may be moved from any one of positions "off" or I to V to a reverse point I R or II R. Fig. 29 shows the connections when the drum 136' has been moved as described to position I R. If it is desired to brake the vehicle the handle 147 should be placed on any one of positions I to V and the drum 80 reversed as previously explained in connection with Fig. 20. Fig. 30 shows braking connections corresponding to position I of drum 136' and reversal of drum 80.

The braking drum 80 shown diagrammatically in Figs. 20 and 23 may be operated by means such as those illustrated in Fig. 34. In this figure the shaft to which the drum 80 is secured is shown as having also secured thereto a pinion 200 which meshes with a rack 201 provided on a foot pedal 204. In the position shown in Fig. 34 the forward set of segments are in contact with their respective brushes $L^{16}$, etc. If the pedal 204 is partially depressed the drum 80 is placed in the out position, that is in the position in which both of the sets of segments are in contact with the brushes $L^{16}$ to $L^{19}$. This causes the fields of both machines to be short-circuited by the brushes $L^{16}$ to $L^{19}$ so that the drive connection between the engine 2 and the rear wheels of the vehicle is rendered inoperative. If the pedal 204 is depressed still farther the braking segments $B^4$ are brought into contact with the brushes $L^{16}$ to $L^{19}$ so that if the handle 147 is at this time on any one of positions I to V the vehicle will be braked as previously explained. A spring 203 may be provided to bias the pedal 204 to the position shown in Fig. 34.

It will be seen that by virtue of the structure last described the drive connection between the engine and the propeller shaft of the vehicle may be rendered inoperative by means of the foot pedal 204 as well as by means of the controller handle 147 in the manner previously described. It should be noted that when the drum 80 is in the braking position the variable braking torque may be exerted on the vehicle by moving the controller handle 147 from position V to position I, or vice versa. As the said handle 147 is moved toward position V the braking torque is diminished whereas if it is moved in the opposite direction the braking torque is increased. Similarly the vehicle may be braked when running backward by depressing pedal 204 and moving handle 147 toward positions I R and II R.

It will be appreciated that my invention, especially the form illustrated in Fig. 20, if employed on an automobile would replace and perform all of the functions of the following elements now commonly employed— (1) the gear transmission, (2) clutch, (3) the gear shift, (4) the engine fly wheel, (5) the lighting generator, and (6) the starting motor.

Among other advantages the following are inherent in the transmission and control system which I have herein described. The starting torque, both forward and reverse, is large and the acceleration of the vehicle is very smoth. There is no loss of power in changing speds as there is no mechanical clutch which must be thrown out. Shifting from one speed to another is accomplished without disconnecting the engine. The transmission is quiet on low speeds as no noisy gears are employed. There is no mechanical connection at any time between the engine and propeller shaft of the vehicle so that the vibration of the car is greatly diminished if not eliminated. The automatic starting of the automobile engine is very quiet as the machine G, which is used as a starting motor, is directly connected to the crank shaft of the engine thereby avoiding the use of gears which are necessarily noisy. No separate lighting generator is necessary as the machine G of the transmission keeps the battery SB charged. An automobile equipped with my invention is much more simple than any make of automobile now known and the various parts of the transmission are readily accessible. The pedal which is used as a clutch pedal in the gear car may be employed to apply the electric brake and to serve as a disconnect pedal to disconnect the engine from the automobile in very much the same manner as the present clutch pedal in the gear car disconnects the engine from the car (see Fig. 34).

When using the electric brake I do not short-circuit the motor through a resistance as has been previously proposed but instead I use the engine for a brake. With a gear car it is possible to use the engine for a brake by shifting the gears before starting down a hill but it is practically impossible to change gears while going down a hill. On the other hand in my system the pedal 204 may be depressed fully and the controller handle 147 moved back and forth until the correct amount of braking is obtained. Moving this handle to a lower speed position increases the braking and moving it to a higher speed position decreases the braking which has been found very satisfactory in practice as it gives as much flexibility in braking as there exists in driving the car from the engine. Preferably the electric brake is intended primarily for use on hills or long grades, mechanical brakes being used for other purposes as at present. The controllers shown diagrammatically in Figs. 4, 20, and 23 are preferably so designed that in changing from any one of positions I to V to another of such positions, the torque transmitted is uninterrupted.

It is obvious that the construction of my electro-magnetic torque applying device may be varied widely. Thus in Fig. 35 the rings 29', 30', and 31' on armature 23' are shown as extending radially, rather than axially, and the rings 26', 27', and 28' on shaft 9' extending radially between the other rings. The magnetic bars 32 also extend radially in this instance, of course.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In combination with a prime mover, a generator driven thereby and including a field element and an armature element, one of which elements is stationary and the other rotatable, a motor having an armature, means for establishing an electrical connection between said generator and the armature of said motor, and means for assisting said motor in driving the load while said electrical connection is maintained, said last named means comprising means separate from the first mentioned means for connecting the armature of said motor with the rotatable element of said generator.

2. The combination of a prime mover, a dynamo driven thereby, a motor having a rotatable element in axial alignment with the dynamo, electrical connections between the dynamo and motor, a driven member adapted to be actuated by the motor, magnetic, non-mechanical means for forming a one-to-one drive connection between the dynamo and motor when said electrical connections have been adjusted for less than the maximum speed, and means for rendering said last mentioned means operative while the rotatable element of said motor is receiving electrical energy from said dynamo and assisting in driving the load.

3. In a power translating apparatus, the combination with a prime mover of a generator armature, a motor armature, means for producing an electro-magnetic flux through said armatures, means for regulating the electro-magnetic flux through the armature, an electro-magnetic torque applying device for forming a one-to-one drive connection between the shafts of said armatures, means for magnetizing said device, and controlling means for regulating the flux through the motor armature so that the latter is operative when said device is operative.

4. In combination, a prime mover, a dynamo connected thereto to be driven thereby, a second dynamo, an electrically responsive device for causing the armature of one of said dynamos to rotate at the same speed as the other, a storage battery for supplying energy to said first named dynamo to start the prime mover, and means for electrically connecting said battery and said electrically responsive device to said dynamos to charge said battery when said electrically responsive device is operative.

5. In an electric transmission system for automotive vehicles, a generator and a motor having independent shafts, a controller therefor, an electro-magnetic device for magnetically but non-mechanically coupling said shafts, a relay having an armature for controlling said device and means operable from said controller for rendering said relay ineffective to control said device.

6. In an electric transmission system for automobiles, a motor, a generator for supplying current to said motor to drive the same, a controller operable from the driver's seat, including means for causing said motor to run in one direction or the other on movement of said controller in one direction or the other away from the off position and means for driving said generator as a motor to start the engine, and means for rendering said controller ineffective to control said motor when said controller is moved toward the off position from the position for starting the engine.

7. A system for propelling a vehicle comprising in combination, an engine, a dynamo mechanically connected thereto, a dynamo mechanically connected to the drive shaft of the vehicle, means comprising a controller for causing said first mentioned dynamo to supply current to said second mentioned dynamo to drive the vehicle forward when said engine is running and said controller is moved in one direction away from the off position, means for reversing said motor on movement of said controller in the opposite direction away from the off position, and means for causing said first named dynamo to act as a motor to start said engine when said controller is moved through and past the reverse positions.

8. In combination, a storage battery, a pair of dynamos, means for driving one of said dynamos as a generator to supply the other as a motor, an electrically responsive device for coupling the armatures of said dynamos, and means for connecting said battery and said device in parallel with each other and in series with said dynamos.

9. In an electric transmission system for automotive vehicles, a generator and a motor having independent shafts, a controller therefor, an electro-magnetic device for magnetically but non-mechanically coupling said shafts, an electro-magnetic member responsive to the current flowing between said generator and motor, for controlling said device and means operable by said controller for rendering said member ineffective to control said device.

10. In an electric transmission system for automotive vehicles, a field having a plurality of pairs of stationary poles distributed around its periphery, a rotatable armature, means for connecting said armature in series with said field, and means for selectively and progressively reversing a portion of said poles.

11. In an electric transmission system for automotive vehicles, a field having a plurality of pairs of poles distributed around its periphery, an armature, means for connecting said armature having a commutator in series with said field, and means for reversing less than half the number of field poles.

12. In an electric transmission system for automotive vehicles, a prime mover, a generator driven thereby, a motor electrically actuated by the generator, and means for varying the relative speeds of the prime mover and motor including a controller for reversing a field pole of said generator.

13. In an electric transmission system for automotive vehicles, a prime mover, a generator driven thereby, a motor electrically actuated by the generator, and means for varying the relative speeds of the prime mover and motor including a controller for reversing a field pole of said motor.

14. The method of varying the relative speeds of a generator and motor each having a plurality of field poles in an electric transmission system which consists in first reversing a pole of the generator to cause it to have the same polarity as an adjacent pole, then operating said first named pole with its normal polarity, and finally reversing a pole of the motor to cause it to have the same polarity as an adjacent pole.

15. In an electric transmission system for automotive vehicles, a prime mover, a generator driven thereby, a motor electrically actuated by the generator, and means for varying the relative speeds of the prime mover and motor including a multi-position controller which for the lowest speed of the motor with respect to the generator reverses a plurality of the field poles of the generator, and which, in successive steps for speeding up the motor progressively reduces the number of reversed poles.

16. In an electric transmission system for automotive vehicles, a prime mover, a generator driven thereby, a motor electrically actuated by the generator, and means for varying the relative speeds of the prime mover and motor including a multi-position controller adapted to control the field circuit of the motor for increasing the relative speed of the motor having means for progressively reversing an increasing number of the field poles of the motor.

In testimony whereof I have affixed my signature.

HARRY L. TANNER.